United States Patent [19]

Jansen

[11] Patent Number: 4,799,668
[45] Date of Patent: Jan. 24, 1989

[54] BICYCLE MOUNTED EXERCISING DEVICE
[76] Inventor: Martin B. Jansen, 29406 Promontory Pl., Agoura Hills, Calif. 91301
[21] Appl. No.: 158,602
[22] Filed: Feb. 22, 1988
[51] Int. Cl.$^4$ .......................... A63B 21/00; A63B 5/00
[52] U.S. Cl. ........................................ 272/73; 272/67
[58] Field of Search .................... 272/67, 68, 73, 132, 272/141, 142, 901, 135, 136, 137, 140; 74/551.1, 551.2, 551.8, 551.9

[56] References Cited
U.S. PATENT DOCUMENTS

| | | |
|---|---|---|
| 630,649 | 8/1899 | Briggs .......................... 74/551.9 |
| 2,782,033 | 2/1957 | Ugartechea . |
| 2,973,962 | 3/1961 | Griffin . |
| 3,084,547 | 4/1963 | Nielsen . |
| 3,396,967 | 8/1968 | Brown . |
| 3,510,130 | 5/1970 | Ferdinand . |
| 3,656,368 | 4/1972 | Schroeder ...................... 74/551.3 |
| 3,717,338 | 2/1973 | Hughes . |
| 3,830,493 | 8/1974 | Miller . |
| 4,171,802 | 10/1979 | Stoecker . |
| 4,337,937 | 7/1982 | Lopez . |
| 4,374,588 | 2/1983 | Ruggles . |
| 4,436,097 | 3/1984 | Cunningham . |
| 4,557,479 | 12/1985 | Guibert . |
| 4,625,963 | 12/1986 | Lancellotti ...................... 272/67 |
| 4,643,417 | 2/1987 | Nieman . |
| 4,664,370 | 5/1987 | Finch . |

Primary Examiner—Richard J. Apley
Assistant Examiner—S. R. Crow
Attorney, Agent, or Firm—Jack C. Munro

[57] ABSTRACT

The incorporation of a wrist exercising device in conjunction with the handlebar of a bicycle which permits the exercising device to be operated as the bicycle is being operated. The exercising device can be pivoted against a spring bias relative to the handlebar in either a clockwise or counterclockwise direction. The movable portion and the fixed portion of the exercising device are interlocked together through a cooperating flange and groove assembly. This interlocking arrangement prevents lineal separation of the parts of the exercising device but yet permits rotation of a portion of the exercising device relative to another portion of the exercising device.

6 Claims, 1 Drawing Sheet

BICYCLE MOUNTED EXERCISING DEVICE

BACKGROUND OF THE INVENTION

The field of this invention relates to an exercising device for exercising of the muscles of the hands, wrists and arms, and more particular to an exercising device which can be mounted in conjunction with a conventional bicycle so that an individual can partake of hand, wrist and arm exercizes during operation of a bicycle.

Bicycles are in widespread usage as a form of exercising device. There are both stationary bicycles, to be normally used indoors, and vehicular type of bicycles to be moved along streets or trails.

Every bicycle has a handlebar. Within a stationary bicycle, the handlebar is grabbed by the hands of theoperator to stabilize the operator during usage of the bicycle. With the vehicular type of bicycle, the handlebar not only provides this stability but also is operated through the front wheel of the bicycle to effect steering of the bicycle.

It is common for the ends of the handlebar to terminate in a handgrip. It is common for the hands of the operator to merely grab onto or exert a slight pressure in conjunction with the handgrip. The main exercising work being utilized has to do with the legs of the user.

There have been previously known exercising devices for the hands, wrists and arms which comprise a pair of members which resemble the handgrips of a bicycle. The exercising device is utilized by grabbing onto the handgrips and to affect turning of the grips relative to each other against a frictional resistance or a spring force. In this manner, exercising can occur of the hands, wrists and arms.

Prior to the present invention, there has not been known any device in which there has been incorporated in conjunction with the handgrip sections of a bicycle an exercising device for the hands, wrists and arms.

SUMMARY OF THE INVENTION

The primary objective of the present invention is to incorporate a rotatable handgrip assembly in conjunction with a bicycle wherein as the handgrip assembly is rotated the rotation occurs against a resistance so that the handgrip assembly can function as an exercising device for the hands, wrists and arms with such exercising to occur as the bicycle is operated.

Another objective of the present invention is to construct an exercising device for a bicycle which can be manufactured and sold as a separate attachment for the bicycle and need not be manufactured as the bicycle is manufactured.

Another objective of the present invention is to construct a bicycle handgrip exercising device which can be manufactured of few parts and manufactured inexpensively to therefore be sold to the ultimate consumer at an inexpensive price.

Another objective of the present invention is to construct an exercising device which can be utilized only when desired and especially during non-strenuous periods of operating of the bicycle such as moving of the vehicular bicycle in a coasting mode.

Another objective of the present invention is to construct an exercising device which can be manufactured of different strength spring rates in order to match physical capabilities of the user and even where different strength springs could be substituted within the device.

The device of the present invention provides for an open-ended sleeve which is to be slipped over the outer free end of the handlebar. The sleeve is rotatable relative to the handlebar but is located in a close conforming manner therewith. Mounted on the sleeve, and substantially covering the sleeve, is a handgrip. The handgrip would normally be constructed of a soft frictionally grabbing material such as a rubber or plastic. The inner end of the sleeve is fixedly secured to a concentric disc. Protruding from the concentric disc is an abutment which is to be located within a spring chamber. The spring chamber is formed within facing semi-cylindrically shaped members which are to be clamped onto the handlebar in a tight fitting manner. A spring assembly is to be located within the spring chamber. Movement of the abutment causes compressing of the spring. The members on the concentric disc are interlocked together to prevent lineal movement in respect to each other while permitting rotational movement of the disc relative to the members.

DETAILED DESCRIPTION OF THE SHOWN EMBODIMENT

It is to be understood for the purpose of this invention that the term bicycle is not only to include a bicycle which moves from one locale to another, but also the stationary type of bicycle which is commonly used as a form of exercise.

Figure 1:
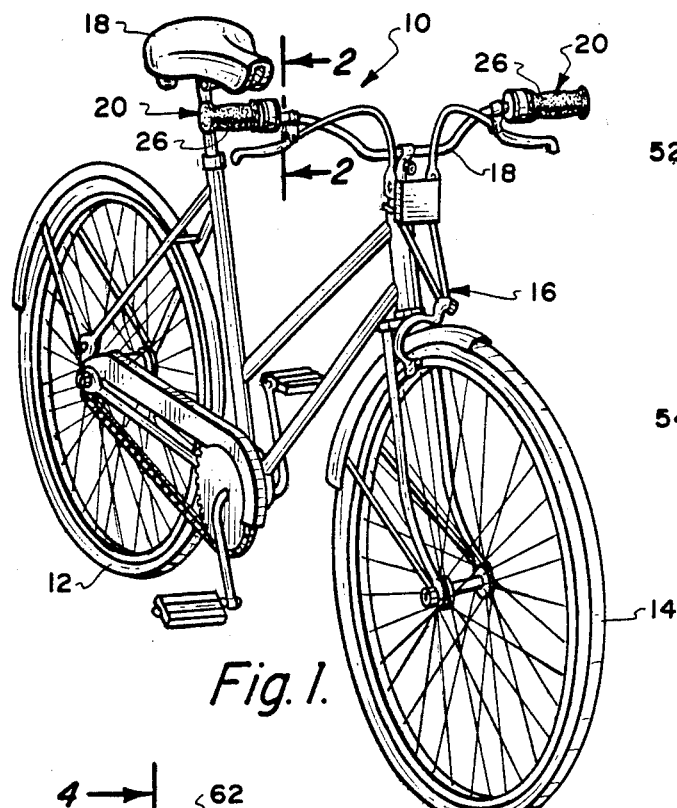
FIG. 1 is an isometric view of a conventional vehicular bicycle upon which there has been mounted a pair of the exercising devices of the present invention.
Figure 2:
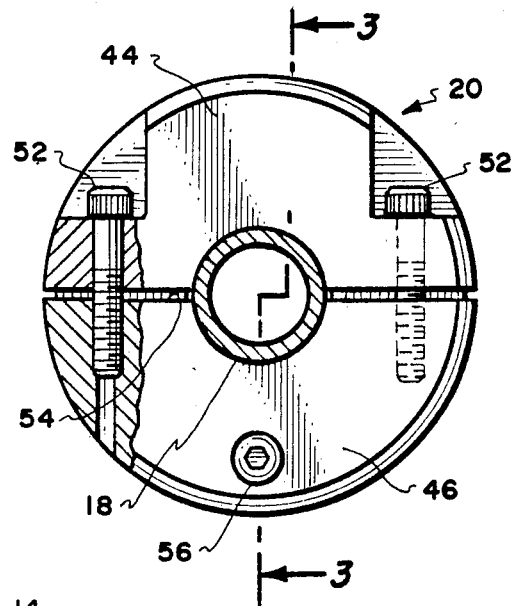
FIG. 2 is an inner end view, partly in cross-section, of one of the exercising devices of the present invention taken along line 2—2 of FIG. 1.

Referring particularly to FIG. 1 there is shown a conventional bicycle 10 which includes a rear wheel 12 and a front wheel 14. The wheels 12 and 14 are supported by means of a frame 16. Mounted on the frame 16 is a seat 18 upon which the user of the bicycle is to sit.

Also connected to the frame 16 is a handlebar 18. The handlebar 18 terminates in a pair of ends. Mounted on each end of the handlebar 18 is the exercising device 20 of this invention. Although the exercising device 20 could be utilized on any shape of bicycle handlebar 18, the device 20 will function best when connected to a substantially straight handlebar 18 which is common within what is termed "mountain bikes" as opposed to the curved type of handlebar which is used in conjunction with "racing bikes".

Figure 3:
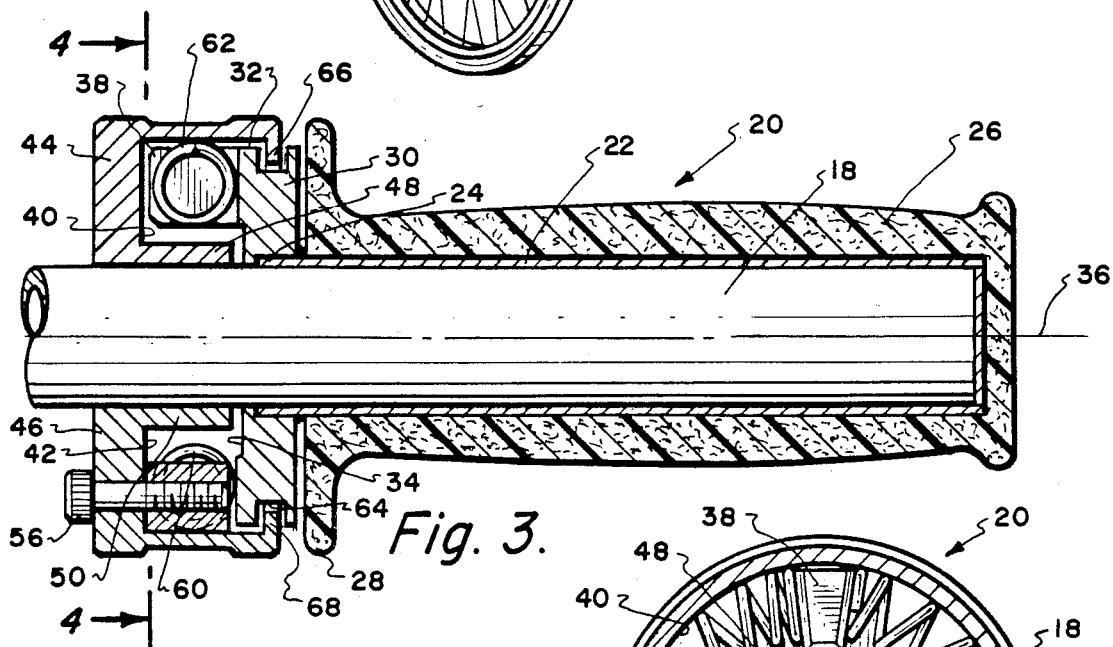
FIG. 3 is a longitudinal cross-sectional view through the exercising device of this invention taken along line 3—3 of FIG. 2.

Referring to FIG. 3, the device 20 includes a sleeve 22. The sleeve 22 is closed at its outer end and is open at its inner end defining an inner edge 24. The sleeve 22 is located about the handlebar 18 in a close conforming manner. However, the sleeve 22 is freely rotatable relative to the handlebar 18.

Fixedly mounted on the exterior surface of the sleeve 22 is a handgrip 26. This handgrip is designed to conform somewhat to a hand or a human being. Also, the handgrip 26 will be constructed of a material which is somewhat compressible such as rubber or plastic. The handgrip 26 is secured as through the use of an adhesive to the sleeve 22. The length of the handgrip 26 is such that it substantially encloses the entire sleeve 22. The inner edge of the handgrip 26 terminates in an annular flange 28.

Fixedly mounted to the inner edge 24 is a concentric disc 30. Normally, this concentric disc 30 will be constructed of a rigid material such as metal or plastic. The disc 30 is to be secured as by welding to the sleeve 22. The disc 30 is also to be freely rotatable relative to the handlebar 18. The disc 30 as an exterior surface which is defined as a circumferential annular surface 32. The disc 30 also has an operating surface 34. Integrally mounted on this operating surface 34 and extending therefrom in a direction parallel to the longitudinal center axis 36 of the handlebar 18 is a narrow abutment 38. The narrow abutment 38 is located within a spring chamber defined by semi-circular recess 40 and semi-circular recess 42. The recess 40 is formed within semi-cylindrical member 44 with the recess 42 being formed within semi-cylindrical member 46. The recesses 40 and 42 cooperate together to form a single and totally enclosed annular chamber which has been previously referred to as a spring chamber.

The member 44 includes a semi-cylindrical sleeve 48. A similar semi-cylindrical sleeve 50 is integrally formed with the semi-cylindrical member 46. The sleeves 48 and 50 are each slightly less than semi-cylindrical. The reason for this is that when these sleeves 48 and 50 are placed against the handlebar 18 that the numbers 44 and 46 can be physically slightly moved toward each other forming a clamping action about the handlebar 18 thereby securely mounting the members 44 and 46 thereon. The bolt fasteners 52 are utilized to create this clamping force between the members 44 and 46. However, even with the members 44 and 46 tightened onto the handlebar 18, there will be formed a slight gap 54 between the members 44 and 46.

Fixedly secured to the member 46 by means of fastener 56 is an abutment 58. The abutment 58 is mounted within the spring chamber and positioned diametrically opposite the abutment 38 relative to the handlebar 18. In observing of FIG. 4 of the drawing, located to the right of abutments 38 and 58 is a coil spring 60. Looking to the left of abutments 38 and 58 is a coil spring 62. The coil springs 60 and 62 are slightly compressed when in the position shown within FIG. 4. This position shown in FIG. 4 is the equilibrium position, in other words, the at-rest position.

Figure 4:
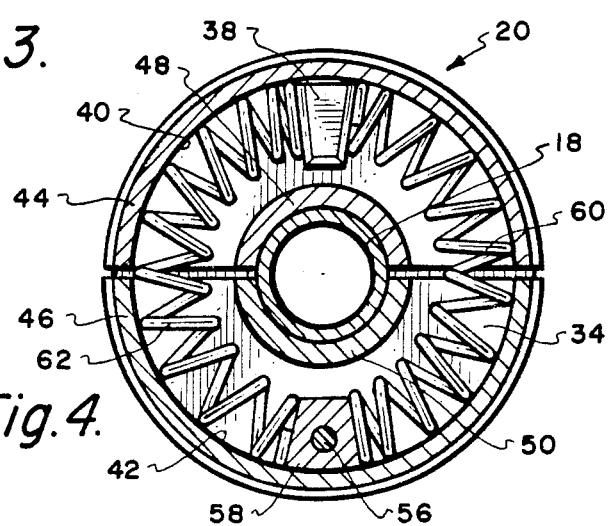
FIG. 4 is a transverse cross-sectional view through the exercise device of this invention taken along line 4—4 of FIG. 3.

In observing of FIG. 4, if the user proceeds to rotate the handgrip 26 clockwise, the spring 60 will compress with spring 62 slightly expanding. The normal amount of movement in a clockwise direction will normally not exceed ninety degrees. Upon return to the equilibrium position and then movement in the counterclockwise direction, spring 62 will compress with spring 60 then slightly extending. Again, the limits of the movement will be about ninety degrees. It can thusly be seen that the user, by rotating of handgrip 26 relative to the handlebar 18, incurs resistance in the form of the bias of the springs 60 and 62 and hence has achieved an exercising device. This resistance increases as the angular movement increases and approaches the limit at about ninety degrees. By changing springs 60 and 62 to springs of higher or lower stiffness (spring rate), the exercising device 20 can be custom tailored to the strength capabilities of the individual user (e.g. small lady versus large man) so that full exercise benefits can be derived by each.

In order to prevent disengagement of the handgrip 26 and the sleeve 22 from the members 44 and 46, there is formed within this circumferential disc 30 an annular groove 64. Integrally formed on the member 44 is a half-circular inwardly depending flange 66. A similar flange 69 is integrally formed on the member 46 with it also being located within the annular groove 64. The arrangement between the flanges 66 and 68 relative to the groove 64 prevents lineal separating movement along the axis 36 between the members 44 and 46 and the handgrip 26. However, rotation of the handgrip 26 relative to members 44 and 46 is permitted.

What is claimed is:

1. In combination with a bicycle, said bicycle having a cylindrical handlebar, said handlebar terminating at a pair of gripping areas, an exercising device connectable to said handlebar at either said gripping area, said exercising device comprising:

a sleeve mounted on a said gripping area, said sleeve having a longitudinal center axis, said sleeve located in a close conforming manner to said handlebar, said sleeve being rotatable relative to said handlebar;

a handgrip fixedly mounted on said sleeve, said handgrip to be graspable by a hand of a human being to affect rotation of said sleeve, said handgrip substantially totally covering said sleeve except for the inner edge of said sleeve;

a concentric disc secured to said inner edge of said sleeve, said concentric disc having a circumferential surface concentrically disposed relative to said handlebar, said concentric disc having an operating surface positioned substantially perpendicular to said longitudinal center axis, a narrow abutment attached to said operating surface and extending outwardly therefrom;

a pair of semi-cylindrically shaped members, fastening means attached to said members for securing together said members into tight engagement onto said handlebar, said members cooperating to form an annular spring chamber, spring means mounted in said annular spring chamber, a portion of said spring means being secured to one of said members, said narrow abutment being located within said spring chamber, rotation of said handgrip causes compressing of said spring means; and means for interlocking said concentric disc and said pair of semi-cylindrically shaped members, said interlocking means preventing lineal movement of said semi-cylindrically shaped members relative to said concentric disc along said longitudinal center axis, and permitting rotation of said concentric disc relative to said semi-cylindrically shaped members.

2. The combination as defined in claim 1 wherein:
said means including an annular groove formed within said circumferential shaped surface, a flange mounted on one of said members, said flange being located within said annular groove.

3. The combination as defined in claim 2 wherein:
said flange being mounted on both of said semi-cylindrically shaped members.

4. In combination with a bicycle, said bicycle having a cylindrical handlebar, said handlebar terminating at a pair of gripping areas, an exercising device connectable to said handlebar at either said gripping area, said exercising device comprising:

a sleeve mounted on a said gripping area, said sleeve having a longitudinal center axis, said sleeve located in a close conforming manner to said handlebar, said sleeve being rotatable relative to said handlebar;

a handgrip fixedly mounted on said sleeve, said handgrip to be graspable by a hand of a human being to affect rotation of said sleeve, said handgrip substantially totally covering said sleeve except for the inner edge of said sleeve;

a concentric disc secured to said inner edge of said sleeve, said concentric disc having a circumferential surface concentrically disposed relative to said handlebar, said concentric disc having an operating surface positioned substantially perpendicular to said longitudinal center axis, a first narrow abutment attached to said operating surface and extending outwardly therefrom;

a pair of semi-cylindrically shaped members, fastening means attached to said members for securing together said members onto said handlebar, said members cooperating to form an annular spring chamber, a second narrow abutment attached to one of said members, said second narrow abutment being located within said spring chamber, said first narrow abutment being located within said spring chamber, said first narrow abutment being located diametrically opposite said second narrow abutment dividing said spring chamber into a pair of sections;

a first spring located in one section, a second spring located in the other said section, rotation of said handgrip causes compressing of either of said first spring or said second spring; and means for interlocking said concentric disc and said pair of semi-cylindrically shaped members, said interlocking means preventing lineal movement of said members relative to said concentric disc along said longitudinal center axis and permitting rotation of said concentric disc relative to said members.

5. The combination as defined in claim 4 wherein:

said means including an annular groove formed within said circumferential shaped surface, a flange mounted on one of said members, said flange being located within said annular groove.

6. The combination as defined in claim 5 wherein:

said flange being mounted on both of said semi-cylindrically shaped members.

* * * * *